(12) United States Patent
Dubal et al.

(10) Patent No.: US 10,007,634 B2
(45) Date of Patent: Jun. 26, 2018

(54) METHOD TO ENABLE INTEL MINI-MEZZ OPEN COMPUTE PROJECT (OCP) PLUG-AND-PLAY NETWORK PHY CARDS

(71) Applicants: Scott P. Dubal, Beaverton, OR (US); Eliel Louzoun, Jerusalem (IL); Douglas Boom, Portland, OR (US); Kent C. Lusted, Aloha, OR (US); Ronald F. Barbee, Tigard, OR (US); Nishantkumar Shah, Portland, OR (US)

(72) Inventors: Scott P. Dubal, Beaverton, OR (US); Eliel Louzoun, Jerusalem (IL); Douglas Boom, Portland, OR (US); Kent C. Lusted, Aloha, OR (US); Ronald F. Barbee, Tigard, OR (US); Nishantkumar Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 14/961,010

(22) Filed: Dec. 7, 2015

(65) Prior Publication Data

US 2017/0161222 A1    Jun. 8, 2017

(51) Int. Cl.
*G06F 13/12* (2006.01)
*G06F 13/38* (2006.01)
(Continued)

(52) U.S. Cl.
CPC .......... *G06F 13/4068* (2013.01); *G06F 13/36* (2013.01); *G06F 13/4282* (2013.01); *H04L 67/10* (2013.01)

(58) Field of Classification Search
None
See application file for complete search history.

(56) References Cited

U.S. PATENT DOCUMENTS 6,839,345 B2 *  1/2005  Lu ....................... H04L 12/2838
                                                    370/365
6,879,645 B1 *  4/2005  Webber, Jr. ............... H04L 1/20
                                                    327/68

(Continued)

FOREIGN PATENT DOCUMENTS

KR   10-2006-0042789 A    5/2006
WO      2017/099917 A1    6/2017

OTHER PUBLICATIONS

International Search Report and Written Opinion received for PCT Patent Application No. PCT/US2016/060790, dated Feb. 17, 2017, 8 pages.

(Continued)

*Primary Examiner* — Michael Sun
(74) *Attorney, Agent, or Firm* — Law Office of R. Alan Burnett, P.S (57) ABSTRACT

Methods for implementing mini-mezzanine Open Compute Project (OCP) plug-and-play Network PHY Cards and associated apparatus. In accordance with one aspect, the MAC (Media Access Channel) and PHY (Physical) layer functions in one or more communication protocol stacks are split between a MAC block in a Platform Controller Hub (PCH) or processor SoC and a PHY card installed in a mezzanine slot of a platform and including one or more ports. During platform initialization operations, configuration parameters are read from the PHY card including a PHY card ID, and a corresponding configuration script is selected and executed to configure the PHY card for use in the platform. The configuration parameters are also used to enumerate PCIe devices associated with physical functions and ports supported by the PHY card.

25 Claims, 7 Drawing Sheets

(51) Int. Cl.
*G06F 13/40* (2006.01)
*H04L 29/08* (2006.01)
*G06F 13/36* (2006.01)
*G06F 13/42* (2006.01)

(56) References Cited

U.S. PATENT DOCUMENTS

| | | | | |
|---|---|---|---|---|
| 7,352,770 | B1* | 4/2008 | Yonge, III | H04B 3/54 |
| | | | | 370/445 |
| 7,904,630 | B2* | 3/2011 | Zhang | G06F 3/0607 |
| | | | | 710/313 |
| 8,356,190 | B2* | 1/2013 | Diab | H04L 12/12 |
| | | | | 713/300 |
| 2003/0026525 | A1* | 2/2003 | Alvarez | H04Q 11/0005 |
| | | | | 385/16 |
| 2003/0231649 | A1* | 12/2003 | Awoseyi | G06F 21/54 |
| | | | | 370/463 |
| 2005/0060503 | A1 | 3/2005 | Buer | |
| 2007/0189304 | A1 | 8/2007 | Rosa | |
| 2012/0236869 | A1* | 9/2012 | Julien | H04L 49/351 |
| | | | | 370/400 |
| 2013/0036231 | A1* | 2/2013 | Suumaki | H04W 12/04 |
| | | | | 709/228 |
| 2013/0282938 | A1* | 10/2013 | Huang | G06F 13/385 |
| | | | | 710/106 |
| 2013/0297802 | A1* | 11/2013 | Laribi | H04L 12/6418 |
| | | | | 709/226 |
| 2014/0161137 | A1* | 6/2014 | Dasari | H04L 47/82 |
| | | | | 370/437 |
| 2014/0258738 | A1* | 9/2014 | Greenwalt | G06F 1/3206 |
| | | | | 713/300 |
| 2014/0281270 | A1* | 9/2014 | Neefs | G06F 12/0813 |
| | | | | 711/143 |
| 2015/0195182 | A1* | 7/2015 | Mathur | H04L 43/50 |
| | | | | 714/27 |

OTHER PUBLICATIONS

Wikipedia, "Server/Specs and Designs", Available online at <http://www.opencompute.org/wiki/Server/SpecsAndDesigns>, page last modified on Mar. 27, 2017, 8 pages.

* cited by examiner

METHOD TO ENABLE INTEL MINI-MEZZ OPEN COMPUTE PROJECT (OCP) PLUG-AND-PLAY NETWORK PHY CARDS

BACKGROUND INFORMATION

In recent years, there has been tremendous growth in "cloud-hosted" computing and services, which are typically facilitated through large data centers. Examples of cloud-hosted services include AMAZON Web Services (AWS™) and Elastic Compute Cloud (EC2), MICROSOFT Azure™ and Office 365™, APPLE iCloud™, various GOOGLE services (e.g., Google Docs™), and online e-mail services such MICROSOFT Hotmail™ (now Outlook Online™), YAHOO mail, and GOOGLE Gmail™, as well as a plethora of small e-mail services. In addition, many eCommerce sites are hosted on third-party operated data centers (e.g., AWS hosts a large number of eCommerce sites, in addition to Amazon.com itself). Streaming media services such as those provided by NETFLIX and YOUTUBE are also hosted by large data centers. Continued exponential growth of cloud-hosted services is expected for the foreseeable future.

Common criteria for data center hardware include flexibility and ease of install and configuration. For example, much of today's data center compute resources (e.g., rack and blade servers) are virtualized, enabling rapid deployment and migration of services, as well as reducing services (and their host hardware energy consumption) during periods of low utilization. It is also preferable that servers and the like be easily configurable. For instance, it is common to have "plug-and-play" (PnP) support for various add-on cards and peripherals, such as network cards and network interface controllers (NICs). Under plug-and-play, a PnP card or peripheral can be automatically configured (or otherwise configured with relative ease).

Recently, members of the Open Compute Project (OCP) has published specifications defining the use of OCP mezzanine cards in OCP Open Rack and other types of servers (available at http://www.opencompute.org/wiki/Server/SpecsAndDesigns) One of the OCP specifications defines a mezzanine form factor for NIC cards. The specification defines support for mezzanine NIC cards with multiple ports and various types of Physical interfaces (PHYs).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods for implement mini-mezzanine Open Compute Project (OCP) plug-and-play Network PHY Cards and associated apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As discussed above, the Open Compute Project has published a specification for implementing a mezzanine card form factor for NIC cards. Under one type of use case, the mezzanine NIC card is similar to conventional NIC card (in terms of functionality), except it has a different form factor and physical connection, and operates as a standalone plug-and-play product. In addition, INTEL® Corporation is developing some new System on a Chip (SoC) processor and Platform Controller Hub (PCH) architectures that integrate Media Access Control (MAC) layer functionary on the SoC or PCH and including a MAC/PHY interface. To take advantage of this architecture in server platforms supporting mezzanine NIC cards, a variant of the mezzanine NIC card is being developed that only includes one or more PHYs and an interface that is configured to connect to the MAC/PHY interface on the SOC/PCH with integrated MACs.

Figure 1:
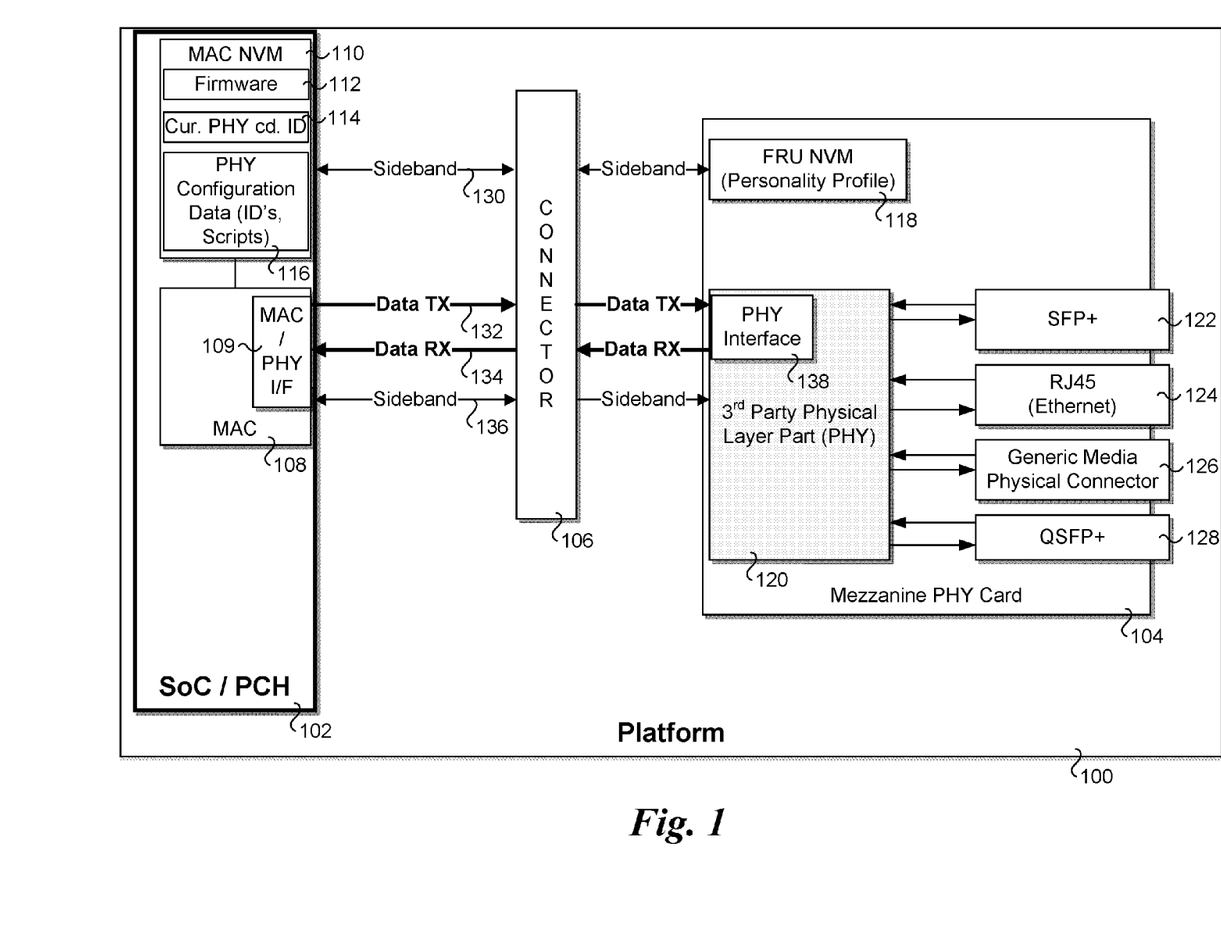
FIG. 1 is a schematic diagram illustrating a platform including an SoC/PCH with an integrated MAC block communicatively coupled to a mezzanine PHY card, according to one embodiment.

An exemplary implementation of this scheme is illustrated in FIG. 1, which shows a platform 100 including an SoC/PHC 102 coupled to a mezzanine PHY card 104, via a connector 106. SoC/PCH 102 includes a MAC block 108 coupled to a MAC non-volatile memory (NVM) 110. MAC block 108 includes circuitry and logic for implementing MAC layer functionality, which would typically implemented on a NIC or NIC card (aka network adapter) under a conventional configuration. MAC block 108 also includes a MAC-to-PHY interface 109. MAC NVM 110 includes firmware (FW) 112, a current PHY card ID 114, and PHY configuration data 116.

Mezzanine PHY card 104 is a field replaceable unit (FRU) that can be installed in a mezzanine card slot of an appropriately configured platform, such as defined in the OCP mezzanine card specification discussed above. In the illustrated embodiment, mezzanine PHY card 104 includes an FRU NVM 118 and a third-party physical layer part (PHY) 120 that is configured to implement PHY operations for one or more different types of physical media. In one embodiment PHY 120 is a standalone chip mounted to a circuit board to which a non-volatile memory device corresponding to FRU NVM 118, such as a Flash chip, is also mounted. Optionally, FRU NVM or similar non-volatile storage circuitry maybe be integrated on a PHY 120 chip.

PHY 120 is depicted as being coupled to multiple connectors that are illustrative of an exemplary, but non-limiting set of types of physical media, including an SFP+ (enhanced Small Form-factor, Pluggable) connector 122, an RJ45 Ethernet connector 124, a generic media physical connector 126, and a QSFP+ (enhanced Quad Small Form-factor Pluggable) connector 128. Although not show for simplicity in FIG. 1, PHY 120 would include circuitry and logic configured to implement PHY layer operations in accordance with applicable standardized physical media specifications associated with each type of physical media that is to be supported by mezzanine PHY card 104.

Various signals are depicted being passed between SoC/PCH 102 and mezzanine PHY card 104 via connector 106. These include sideband signals 130, data transmit (TX) signals 132, data receive (RX) signals 134, and sideband signals 136. Generally, various electronic pathways may be used for these signals, such as traces and vias in printed circuit boards (PCBs) and cables.

In the embodiment illustrated in FIG. 1, PHY 120 is depicted as including a PHY interface 138. Depending on the particular physical media, a PHY will typically include multiple layers, with the top layer interfacing with the bottom layer of the MAC. In some embodiments, such as various high speed Ethernet standards, a reconciliation layer sits between the top PHY layer and the MAC. As another option, a MAC-to-PHY interface may be implemented in PHY 120, in which case MAC-to-PHY interface 109 would be a MAC interface (not shown). Generally, the reconciliation layer, if applicable, may be implemented on any of a MAC interface, a PHY interface, or a MAC-to-PHY interface (not shown).

Generally, the combination of functionality provided by the MAC block and PHY card will support the MAC and PHY layer functionality associated with a multi-layer communication protocol stack including MAC and PHY layers. Moreover, and given MAC block and PHY card may be configured to support the MAC and PHY layer functionality associated with multiple communication protocol stacks, including different communication protocol stacks.

Figure 1A:
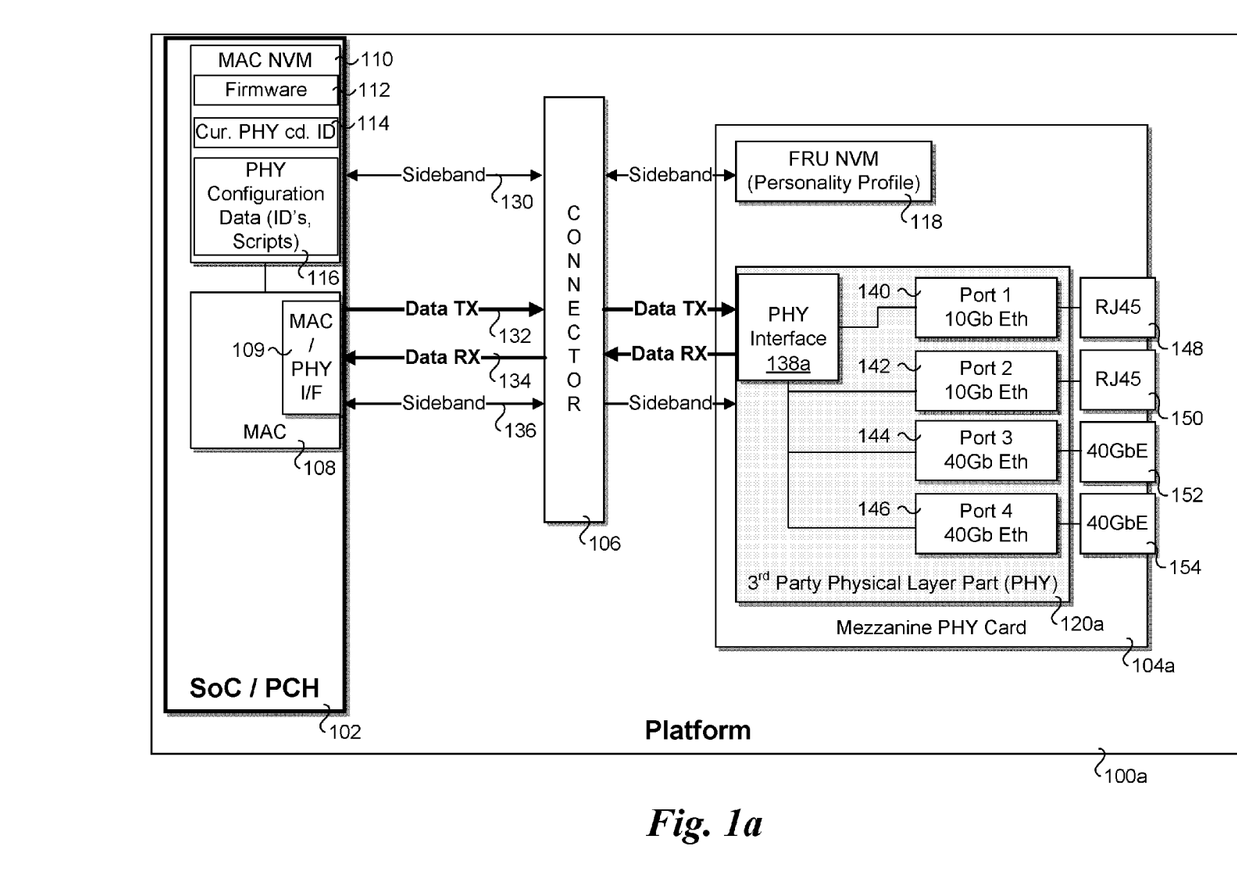
FIG. 1a is a schematic diagram illustrating a platform including an SoC/PCH with an integrated MAC block communicatively coupled to a mezzanine PHY card including two 10 Gb Ethernet ports and two 40 Gb Ethernet ports, according to one embodiment.

FIG. 1a shows a platform 100a that includes a mezzanine PHY card 104a providing four high-speed Ethernet ports. Ports 1 and 2 are configured as 10 Gb Ethernet ports 140 and 142, while ports 3 and 4 are 40 Gb/s Ethernet ports 144 and 146. 10 Gb Ethernet ports 140 and 142 are coupled to RJ45 connectors 148 and 150, while 40 Gb Ethernet ports 144 and 146 are coupled to 40 GbE connectors 152 and 154. Each of 10 Gb Ethernet ports 140 and 142 and 40 Gb Ethernet ports 144 and 146 are also coupled a PHY interface 138a.

In one embodiment, 10 Gb Ethernet ports 140 and 142 employ IEEE 802.3 10GBASE-R Physical Medium Attachment (PMA) sublayers and Physical Medium Dependent (PMD) service interfaces defined by IEEE 802.3 10GBASE-SR, 10GBASE-LR, 10GBASE-KR, or 10GBASE-PR. In one embodiment, 40 Gb Ethernet ports 144 and 146 employ IEEE 802.3 40GBASE-R Physical Medium Attachment (PMA) sublayers and Physical Medium Dependent (PMD) service interfaces defined by IEEE 802.3 ba 40GBASE-SR4, 10GBASE-LR4, 10GBASE-KR4, or 10GBASE-CR4.

In addition to the Ethernet communication protocol, other multi-layer communication protocols and fabrics may also be supported, including FibreChannel, InfiniBand, INTEL® OmniPath Architecture fabric, SONET, TCP/IP, UDP, etc. Generally, the techniques disclosed herein are not limited to a specific protocol or set of protocols.

Figure 2A:
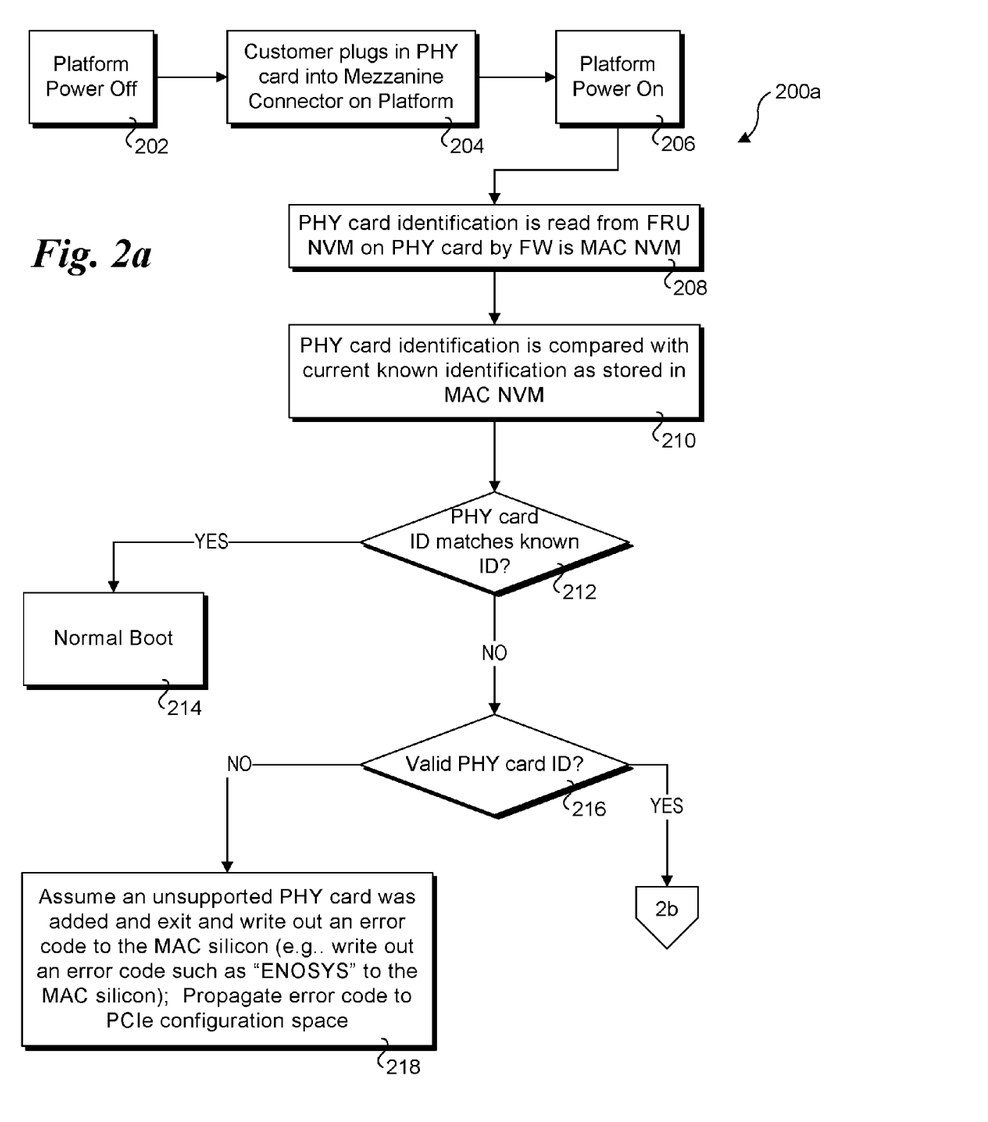
FIGS. 2a and 2b collectively comprises a flowchart illustrating operations and logic implemented during pre-boot operations to configured implementation of a mezzanine PHY card in a computer platform, according to one embodiment.

With reference to flowchart portions 200a and 200b of FIGS. 2a and 2b, operations and logic to configure a mezzanine PHY card and MAC during platform initialization operations, according to one embodiment, proceed as follows. First, in a block 202, the platform power is off. The customer/user then plugs in the PHY card into the mezzanine connector on the platform, as shown in a block 204. The platform is then powered on in a block 206, which initiates the platform's normal boot-up processes.

Figure 3:
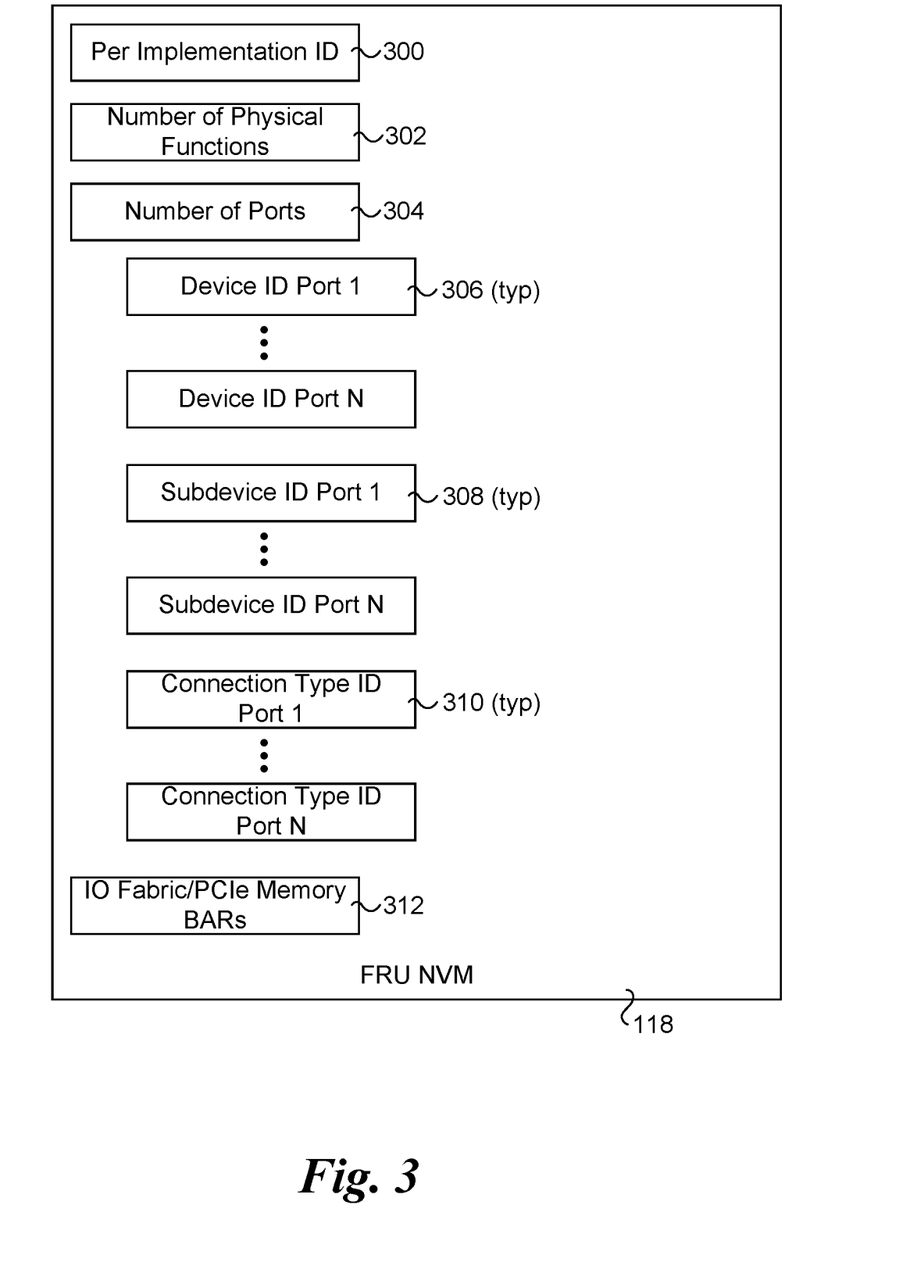
FIG. 3 is a schematic block diagram illustrating an exemplary set of configuration parameters and data stored in an FRU NVM, according to one embodiment

In a block 208, the PHY card identification (ID) is read from FRU NVM on the PHY card by MAC firmware. In one embodiment, instructions stored in firmware 112 in MAC NVM 110 are executed on one of the processor cores on SoC/PCH 102 (not shown in FIGS. 1 and 1a), or otherwise by a processing component that is used during the platform's pre-boot process. As shown in FIG. 3, in one embodiment the PHY card ID is stored as a PHY card per implementation ID 300 in FRU 118 (referred to a PHY card ID 300 below).

In a block 210, the PHY card ID is compared with a current known PHY card ID, as stored in MAC NVM 110 as current PHY card ID 114. The current known PHY card ID corresponds to the PHY card ID that was most recently installed in the platform. In a decision block 212, a determination is made to whether PHY card ID 300 matches current PHY card ID 114. Since this is the first boot after a new mezzanine PHY card is installed, there will be either no PHY card ID value stored for current PHY card ID 114, or the current PHY card ID value will be different than PHY card ID 300 (for instances under which the mezzanine PHY card is a replacement for a previously installed PHY card). Accordingly, the answer to decision block 212 is NO, and the logic proceeds to a decision block 216 in which a determination is made to whether the PHY card ID is valid.

In one embodiment, SoC/PCH 102 maintains a list of valid PHY card IDs in PHY configuration data 116. Generally, a given SoC or PCH model or SKU (Stock Keeping Unit) will be configured to support various PHY card configurations and capabilities, and include a list of PHY card IDs that it supports. This PHY card ID list may generally be written to PHY configuration data 116 during SoC or PCH manufacture or system integration. In addition, the PHY configuration data may be updated in the field or otherwise updated subsequent to manufacture or system integration to support new PHY cards with PHY card IDs that currently aren't in the list.

If the PHY card ID is not valid (e.g., not in the list of PHY card IDs stored in configuration data 116), the answer to decision block 216 is NO, and the logic proceeds to a block 218. In block 218, in one embodiment it is assumed that an unsupported PHY card was added, and the process exits and writes out an error code to the MAC silicon, such as writing out an "ENOSYS" error code. In one embodiment, the error code is propagated to the PCIe (Peripheral Component Interconnect Express) configuration space, which enables logic used for enumerating and configuring PCIe devices to recognize that the PHY card is unsupported, and thus not configure it to be accessed by the platform.

Figure 2B:
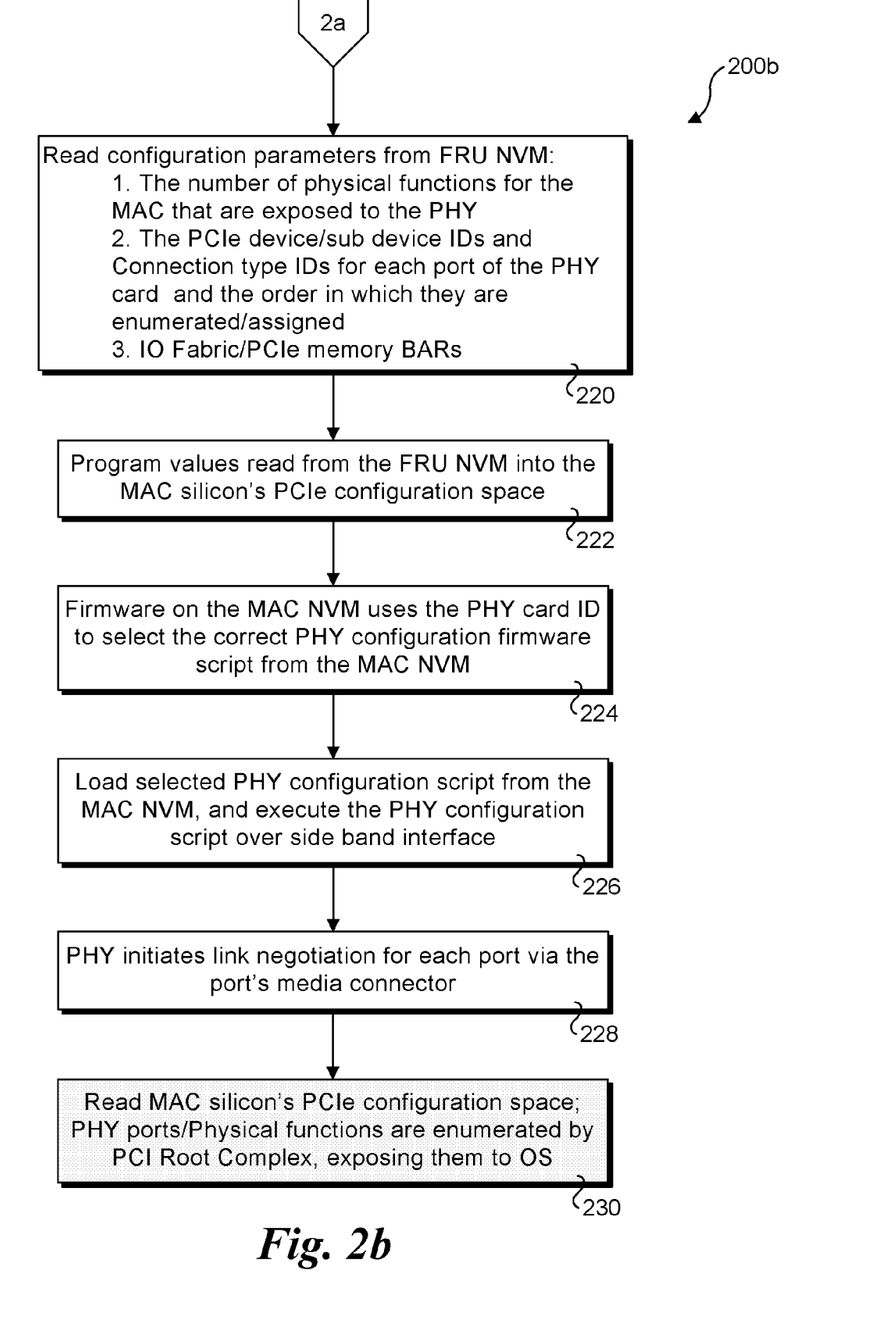

If the PHY card ID is valid, the answer to decision block 216 is YES, and the logic proceeds to the portion 200b of the flowchart shown in FIG. 2b. In a block 220, various configuration parameters are read from the FRU NVM. FIG. 3 shows some of the configuration parameters used by one embodiment, which includes the number of physical functions 302 for the MAC that are exposed to the PHY card, the number of ports 304, a set of port device IDs 306 (one for each port), a set of port subdevice IDs 308 (one for each port), a set of port configuration type IDs 310 (one for each port), and IO Fabric/PCIe memory base address registers (BARs) 312. It is noted that the set of configuration parameters illustrated in FIG. 3 is merely exemplary and non-limiting, as other types of configuration parameters and data may also be stored in an FRU NVM.

Returning to block 220, in the illustrated embodiment the configuration parameters that are read from the FRU NVM include the number of physical functions 302 for the MAC that are supported by the PHY card, the number of ports, the PCIe device IDs 306, subdevice IDs 308 and connection type IDs 310 for each port of the PHY card and the order in which they are enumerated/assigned, and IO Fabric/PCIe memory BARs 312.

In a block 222, the configuration values read from the FRU NVM are programmed into the MAC silicon's PCIe configuration space. In one embodiment, default PCIe configuration information is built into the MAC silicon, but can be overridden by the MAC NVM. In a block 224, firmware 112 uses the PHY card ID to select the correct PHY configuration firmware script from PHY configuration data 116. Next, in a block 226, the selected PHY configuration script is loaded and executed over side band interface 136, which results in configuration of the PHY card. Once configured, the PHY card initiates link negotiation for each of its ports via the media connector for each port, as shown in a block 228.

Each of the foregoing operations is performed during "pre-boot" processes prior to PCIe device enumeration and configuration. During PCIe device enumeration and configuration, configuration data is read by a PCIe Root Complex to enumerate the PCIe interconnect hierarchy and PCIe devices coupled to the PCI interconnect segments in the hierarchy. As part of this operation, in a block 230 the MAC silicon's PCIe configuration space is read. The PCIe configuration data in the PCIe configuration space is formatted to enable the PCIe Root Complex to enumerate the PHY ports and/or physical functions supported by the mezzanine PHY card, which are enumerated as respective PCI devices. As part of the PCIe configuration process, this PCIe configuration data is read by the operating system, thereby exposing the mezzanine PHY cards ports/physical functions to the OS and making them available for access by software running on the platform.

The enumeration and identification of PCIe devices, in combination with compatible OS drivers, enables the inherent plug-and-play functionality supported by the PCIe architecture. Under the embodiments herein, the split MAC-PHY layer implementation is transparent to the platform's host operating system. Rather, from the standpoint of the OS, it simply sees a NIC card (or other communication protocol card) supporting one or more PCIe device functions.

Figure 4:
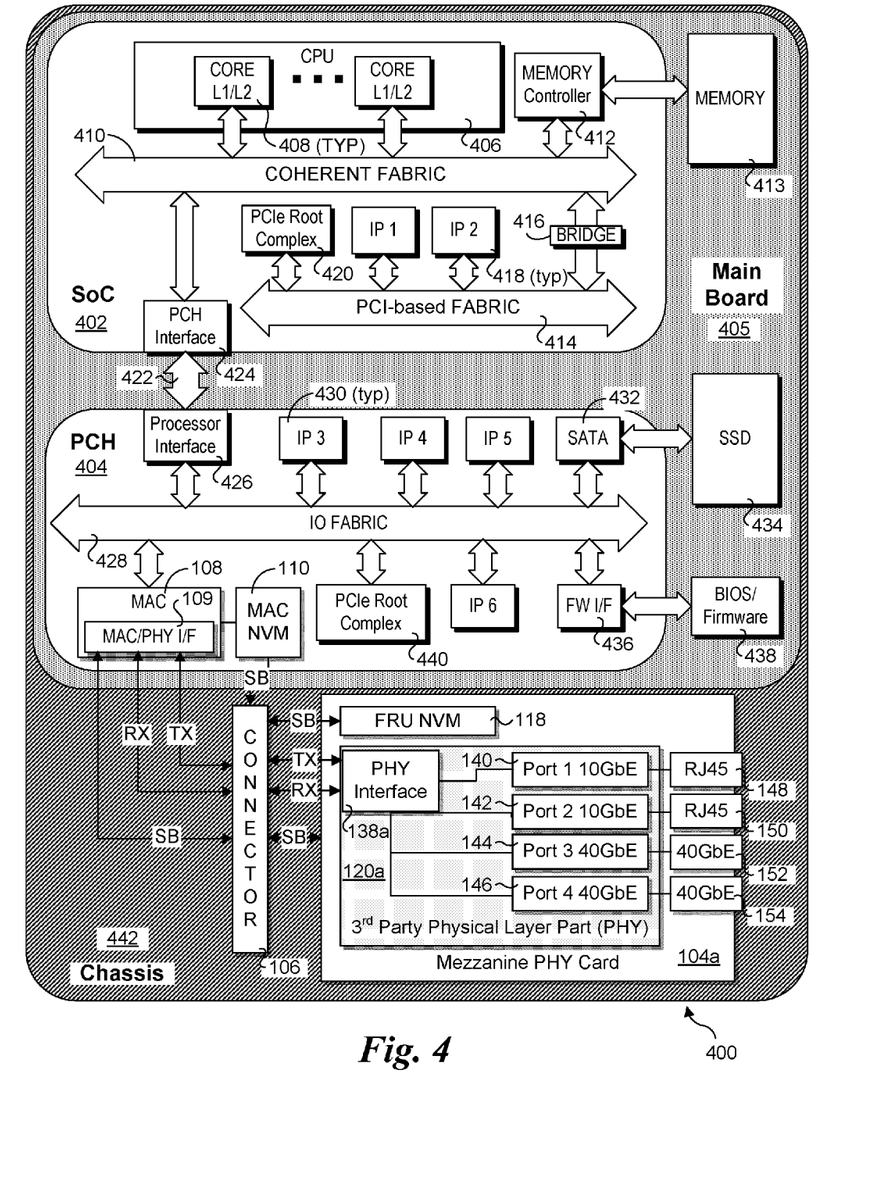
FIG. 4 is a schematic diagram illustrating a platform architecture employing a processor SoC coupled to a PCH with an integrated MAC block that is communicatively coupled to a Mezzanine PHY card, according to one embodiment.
Figure 5:
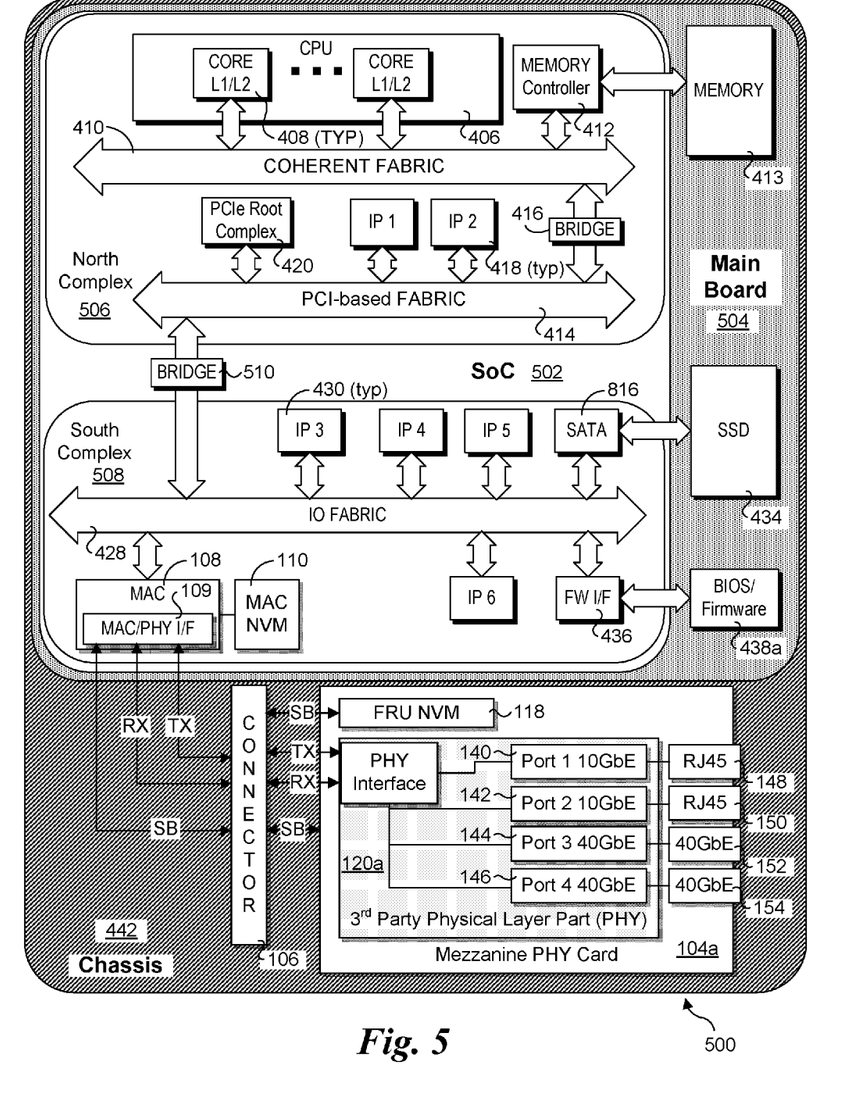
FIG. 5 is a schematic diagram illustrating a platform architecture employing a processor SoC with an integrated MAC block that is communicatively coupled to a Mezzanine PHY card, according to one embodiment.

FIGS. 4 and 5 show exemplary platform architectures 400 and 500 the support use of mezzanine PHY cards in accordance with aspects of the embodiments described herein. As shown in FIG. 4, platform architecture 400 includes a processor SoC 402 and a PCH 404 mounted on a main board 405 and coupled to one another via interconnected wiring in the main board. Processor SoC 402 includes a CPU (central processor unit) 406 including a plurality of processor cores 408 coupled to a coherent fabric 410. Each of cores 408 includes a Level 1 (L1) and Level 2 (L2) cache. A memory controller 412 is also coupled to coherent fabric 410, and is configured to provide access to system memory 413 (e.g., a type of Dynamic Random Access Memory (DRAM)) via one or more memory channels. A last level cache (LLC) may also be coupled to coherent fabric 410 (not shown), and, along with various cache agents in the like (also not shown), the L1/L2 caches, LLC, and memory 414 form a coherent memory domain.

A PCI-based fabric 414 (e.g., a $3^{rd}$ generation PCIe fabric) is coupled to coherent fabric 410 via a fabric-to-fabric bridge 416. Various Intellectual Property (IP) blocks 418 are coupled to PCI-based fabric 414, is depicted by IP blocks labeled IP 1 and IP 2. A PCIe Root Complex 420 is also coupled to PCI-based fabric 414. For simplicity, PCI-based Fabric is shown as a single fabric segment, but may comprise multiple fabric segments in a PCI-based hierarchy, as is well-known in the art.

Processor SoC 402 may be communicatively coupled to PCH 404 via various types of interconnects and corresponding interfaces. For simplicity, an interconnect 422 is depicted as being connected between a PCH interface 424 and a processor interface 426. In a typical implementation, both PCH interface 424 and a processor interface 426 will share the same link interface on the interconnect side, while being configured to interface to the respective fabrics to which each of PCH interface 424 and a processor interface 426 is coupled. Under various embodiments, interconnect 422 comprises a Quickpath Interconnect (QPI™) link, a Keizer Technology Interconnect (KTI) link, an Ultrapath Interconnect (UPI) link, a Direct Media Interface (DMI) link, or any type of existing or future high-speed chip-to-chip interconnect.

In addition to processor interface 426, PCH 404 includes an IO (Input/Output) fabric 428 to which various IP blocks 430 are coupled, as depicted by IP 3, IP 4, IP 5, and IP 6. Each of IP blocks 430 may be configured to perform one or more functions and/or may comprise an interface to a component that is external to PCH 404. For example, IP blocks 430 may include but are not limited to PCIe interfaces, USB (Universal Serial Bus) interfaces, General Purpose IO (GPIO), System Management Bus (SMBus) interfaces, high definition audio, power management, low pin count (LPC) interfaces, SPI, video display interfaces, system management interfaces, and JTAG interfaces. Additional IP blocks coupled to IO fabric 428 that are specifically depicted in FIG. 4 include a Serial ATA interface 432 coupled to a solid state drive (SSD) 434, a firmware interface 436 coupled to BIOS/firmware 438, and a PCIe Root Complex 440.

PCH 404 further includes a MAC block 108 coupled to a MAC NVM 110 and including a MAC-to-PHY interface 109. MAC-to-PHY interface 109 is coupled to various pins on a connector 106 to which a mezzanine card 104*a* is also coupled, enabled TX data, RX data and side band signals to be passed between MAC block 108 and components on mezzanine card 104*a*, including FRU NVM 118 and PHY interface 138*a*. In one embodiment, connector 106 is mounted to a mezzanine "shelf" or the like in a chassis 422, and signals corresponding to the TX data, RX data, and sideband signals are coupled between connector 106 and PCH 404 via one or more cables and/or applicable wiring and vias formed in main board 405 and another board to which connector 106 is mounted.

In platform architecture 500 of FIG. 5, a processor SoC 502 is mounted on a main board 504 and is communicatively coupled to a Mezzanine PHY card 104*a* via a connector 106 and applicable signal routing means (e.g., cabling and/or wiring paths/vias in main board 504). Rather than have a separate processor SoC and a PCH, processor SoC 502 implements the functionality of selected PCH blocks on the same SoC as the processor core components and interconnects. As illustrated, the upper portion of processor SoC 502 is part of a "North" complex 506, while the bottom portion is part of a "South" complex 508. The North and South complex names are a variation of the historical North Bridge (processor) and South Bridge (PCH) found in platform chipsets developed by INTEL® Corporation.

Generally, components in each of North complex 506 and South complex 508 sharing the same reference number of components in SoC 402 and PCH 404 of FIG. 4 are configured in a similar manner and perform similar functions. As further shown in FIG. 5, SoC 502 employs a bridge 510 that is coupled between PCI-based fabric 414 and IO fabric 428. In addition, architecture 500 employs BIOS/Firmware 438*a*, which is similar to BIOS/Firmware 438 with some differences accounting for the different IP blocks in architectures 400 and 500.

Generally, IO fabric 428 may comprise any of various types of existing and future IO fabrics and/or interconnect structures, including but not limited to PCIe, INTEL® On-chip Scalable Fabric (IOSF), Open Core Protocol (OCP), Advanced Microcontroller Bus Architecture (AMBA) (e.g., Advanced High-performance Bus (AHB)), and Basic Virtual Component Interface (BVCI) interconnects.

Further aspects of the subject matter described herein are set out in the following numbered clauses:

1. An integrated circuit (IC), configured to be installed in a computer platform including a PHY card, comprising:

a media access control (MAC) block, configured to implement MAC layer functionality associated with one or more communication protocol stacks including a Physical layer (PHY);

an interface, configured to couple signals between the MAC block and the PHY card when the IC is installed in the computer platform, the PHY card including at least one port and configured to support Physical layer functionality associated with at least one communication protocol stack among the one or more communication protocol stacks; and firmware instructions, stored on the IC, configured to be executed by one of a processing element on the IC or on a processing element in a processor to which the IC is configured to be coupled to when installed in the computer platform, the firmware instructions coded, upon execution, to configure the PHY card for use in the computer platform.

2. The IC of clause 1, wherein the IC comprises a Platform Controller Hub configured to interface to a processor.

3. The IC of clause 1 or 2, wherein the IC comprises a processor System on a Chip (SoC).

4. The IC of any of the preceding clauses, wherein the compute platform includes a mezzanine card slot configured in accordance with an Open Computer Platform (OCP) specification, and the PHY card comprises a mezzanine PHY card configured to be installed the mezzanine card slot.

5. The IC of any of the preceding clauses, wherein the interface comprises a MAC-to-PHY interface configured to interface with a PHY interface on the PHY card.

6. The IC of any of the preceding clauses, wherein the interface comprises a MAC interface configured to interface with a MAC-to-PHY interface on the PHY card.

7. The IC of any of the preceding clauses, wherein the IC further includes non-volatile memory, and wherein the firmware instructions, when executed, are configured to cause the IC to:

read PHY card configuration data stored on the PHY card including a PHY card identifier (ID); and compare the PHY card ID to a list of valid PHY card IDs stored in the non-volatile memory to determine whether the PHY card is supported by the IC.

8. The IC of any of the preceding clauses, wherein the firmware instructions, when executed, are configured to cause the IC to:

read configuration parameters from the PHY card, including a number of ports provided by the PHY card, and at least one of a device and subdevice ID for each port; and program Peripheral Component Interconnect Express (PCIe) configuration parameters corresponding to the configuration parameters that are read into a PCIe configuration space associated with the MAC block.

9. The IC of clause 8, wherein the firmware instructions, when executed, are configured to cause the IC to:

store, on the IC, a current PHY card identifier (ID) corresponding to a PHY card currently installed in the computer platform;

during a subsequent initialization of the computer platform, read a PHY card identifier (ID) stored on a PHY card installed in the compute platform during the subsequent initialization of the computer platform; and compare the PHY card ID that is read to the current PHY card ID that is stored, and if there is a match, use the PCI configuration parameters programmed into the PCIe configuration space.

10. The IC of clause 8, wherein the IC further comprises a PCIe Root Complex and a PCIe interconnect segment to which the MAC block is coupled, and wherein the IC is configured, when operating, to read the PCIe configuration parameters and enumerate one or more PCIe devices corresponding to Physical functions supported by the PHY card.

11. The IC of any of the preceding clauses, wherein a PHY configuration script for each of at least one PHY card is stored on the IC, and wherein the firmware instructions, when executed, are configured to cause the IC to:

read a PHY card identifier (ID) stored on the PHY card;

select a PHY configuration script stored on the IC based on the PHY card ID; and execute the PHY configuration script to configure the PHY card.

12. A method, comprising:

reading PHY card configuration data stored on a PHY card including a PHY card identifier (ID), the PHY card installed in a computer platform including at least one port and configured to support Physical layer functionality associated with at least one communication protocol stacks and to communicate with a Media Access Control (MAC) block configured to support MAC layer functionality for the at least one communication protocol stack, the MAC block implemented in an integrated circuit (IC) component in the computer platform that is separate from the PHY card;

comparing the PHY card ID to a list of valid PHY card IDs to determine whether the PHY card is a valid PHY card; and if the PHY card is determined to be a valid PHY card, configuring the PHY card to implement Physical layer functionality associated with the at least one communication protocol stack for at least one port.

13. The method of clause 12, further comprising:

reading configuration parameters from the PHY card, including a number of ports provided by the PHY card, and at least one of a device and subdevice ID for each port; and programming Peripheral Component Interconnect Express (PCIe) configuration parameters corresponding to the configuration parameters that are read into a PCIe configuration space associated with the MAC block.

14. The method of clause 12 or 13, further comprising reading the PCIe configuration parameters and enumerating one or more PCIe devices corresponding to Physical functions supported by the PHY card.

15. The method of any of clauses 12-14, further comprising:

storing a current PHY card identifier (ID) corresponding to a PHY card installed in the computer platform on the IC component;

during a subsequent initialization of the compute platform, reading a PHY card identifier (ID) stored on the PHY card;

comparing the PHY card ID that is read to the current PHY card ID that is stored, and if there is a match, use the PCIe configuration parameters programmed into the PCIe configuration space.

16. The method of any of clauses 12-15, further comprising:

storing a PHY configuration script for at least one PHY card;

selecting a PHY configuration script based on the PHY card ID that is read; and executing the PHY configuration script to configure the PHY card.

17. The method of any of clauses 12-16, further comprising:

determining the PHY card ID corresponds to a PHY card that is not supported by the MAC layer block;

writing out an error code; and propagating the error code to a Peripheral Component Interconnect Express (PCIe) configuration space associated with the MAC block.

18. The method any of clauses 12-17, further comprising implementing communication between the IC component and the PHY card using at least one sideband channel;

19. The method any of clauses 18, further comprising implementing communication between the IC component and the PHY card using two sideband channels.

20. The method any of clauses 12-19, wherein the PHY card is installed in a mezzanine card slot configured in accordance with an Open Computer Platform (OCP) mezzanine card specification.

21. The method of any of clauses 12-20, wherein the IC component comprises a Platform Controller Hub configured to interface to a processor.

22. The method of any of clauses 12-21, wherein the IC component comprises a processor System on a Chip (SoC).

23. A computer platform comprising:

a main board;

a mezzanine card slot including a connector communicatively coupled to the main board;

a PHY card, coupled to the connector and installed in the mezzanine card slot, the PHY card including at least one port and configured to support Physical (PHY) layer functionality associated with at least one communication protocol stack including a media access control (MAC) layer; and an integrated circuit (IC) chip, mounted on the main board and including, a MAC block, configured to implement MAC layer functionality associated with one or more communication protocol stacks including a PHY layer;

an interface, configured to couple signals between the MAC block and the PHY card via the connector; and firmware instructions, configured to be executed by one of a processing element on the IC or on a processor to which the IC is configured to be coupled to when installed in the computer platform, the firmware instructions configured, upon execution, to configure the MAC block and PHY card for use in the computer platform.

24. The computer platform of clause 23, wherein the IC chip comprises a Platform Controller Hub (PCH), and the computer platform further includes a processor to which the PCH is coupled.

25. The computer platform of clause 23 or 24, wherein the IC chip comprises a processor System on a Chip (SoC).

26. The computer platform of any of clauses 23-25, wherein the firmware instructions, upon execution, are further configured to:

read configuration parameters from the PHY card, including a number of ports provided by the PHY card, and at least one of a device and subdevice ID for each port; and program Peripheral Component Interconnect Express (PCIe) configuration parameters corresponding to the configuration parameters that are read into a PCIe configuration space associated with the MAC block, and wherein the computer platform is configured to read the PCIe configuration parameters and enumerate one or more PCIe devices corresponding to Physical functions supported by the PHY card.

27. The computer platform of clause 26, wherein the firmware instructions, upon execution, are further configured to:

store a current PHY card identifier (ID) corresponding to a PHY card installed in the computer platform on the IC component;

during a subsequent initialization of the compute platform, read a PHY card identifier (ID) stored on the PHY card; and compare the PHY card ID that is read to the current PHY card ID that is stored, and if there is a match, use the PCIe configuration parameters programmed into the PCIe configuration space to enumerate the one or more PCIe devices corresponding to Physical functions supported by the PHY card.

28. The computer platform of any of clauses 23-27, wherein the firmware instructions, upon execution, are further configured to:

read PHY card configuration data stored on the PHY card including a PHY card identifier (ID);

compare the PHY card ID to a list of valid PHY card IDs stored on the IC chip to determine whether the PHY card is a valid PHY card; and if the PHY card is determined to be a valid PHY card, configure the PHY card to implement Physical layer functionality associated with the at least one communication protocol stack for at least one port.

29. The computer platform of any of clauses 23-28, wherein the IC chip further comprises a PCIe Root Complex and a PCIe interconnect segment to which the MAC block is coupled, and wherein the IC chip is configured, when operating, to read the PCIe configuration parameters and enumerate one or more PCIe devices corresponding to Physical functions supported by the PHY card.

30. The computer platform of any of clauses 23-29, wherein a PHY configuration script for each of at least one PHY card is stored on the IC, and wherein the firmware instructions, when executed, are configured to cause the IC to:

read a PHY card identifier (ID) stored on the PHY card;

select a PHY configuration script stored on the IC based on the PHY card ID; and execute the PHY configuration script to configure the PHY card.

31. A Physical layer (PHY) card, configured to be installed in a computer platform and communicatively coupled, via a connector, to an integrated circuit including a media access control (MAC) block, the MAC block configured to implement MAC layer functionality associated with one or more communication protocol stacks including MAC and PHY layers, the PHY card comprising:

at least one interface, configured to couple signals between the PHY card and the MAC block via the connector when the PHY card is installed in the computer platform and operating;

circuitry and logic configured to support PHY layer functionality associated with at least one communication protocol stack among the one or more communication protocol stacks for at least one port; and non-volatile memory (NVM) having PHY card configuration data stored therein, wherein when the PHY card is installed in the computer platform and the computer platform is initialized, the PHY card is configured to send at least a portion of the configuration data to the integrated circuit via the at least one interface.

32. The PHY card of clause 31, wherein the PHY card does not support MAC layer functionality.

33. The PHY card of clause 31 or 32, wherein the PHY card includes a plurality of ports, and wherein the configuration data in the NVM includes one or more of:

the number of ports;

a device identifier (ID) per each port; and a connection type ID per each port.

34. The PHY card of clause 33, wherein the configuration data in the NVM further includes a subdevice ID per port.

35. The PHY card of any of clause 31-34, wherein the configuration data in the NVM includes information identifying Physical functions supported by the PHY card.

36. The PHY card of any of clauses 31-35, wherein the configuration data includes a per-implementation identifier.

37. The PHY card of any of clauses 31-36, wherein the PHY card includes multiple types of ports, and the PHY card supports different PHY layer functionality for at least two types of ports.

38. The PHY card of any of clauses 31-37, wherein the at least one interface includes a PHY interface that is configured to receive data transmitted from the MAC block and transmit data to the MAC block.

39. The PHY card of any of clauses 31-38, wherein the at least one interface includes at least one sideband interface configured to transfer configuration data to the integrated circuit.

40. The PHY card of clause 39, wherein the MAC block includes MAC NVM, and the sideband interface is configured to transfer configuration data to a sideband interface associated with the MAC NVM.

41. The PHY card of any of clause 31-40, wherein the compute platform includes a mezzanine card slot configured in accordance with an Open Computer Platform (OCP) specification, and the PHY card comprises a mezzanine PHY card configured to be installed the mezzanine card slot.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An integrated circuit (IC), configured to be installed in a computer platform including a Physical layer (PHY) card, comprising:
    a media access control (MAC) block, configured to implement MAC layer functionality associated with one or more communication protocol stacks that include a Physical layer;
    an interface, configured to couple signals between the MAC block and the PHY card when the IC is installed in the computer platform, the PHY card including at least one port and configured to support Physical layer functionality associated with at least one communication protocol stack among the one or more communication protocol stacks; and
    firmware instructions, stored on the IC, configured to be executed by one of a processing element on the IC or on a processing element in a processor to which the IC is configured to be coupled to when installed in the computer platform, the firmware instructions coded, upon execution, to configure the PHY card for use in the computer platform.

2. The IC of claim 1, wherein the IC comprises a Platform Controller Hub (PCH) configured to interface to a processor.

3. The IC of claim 1, wherein the IC comprises a processor System on a Chip (SoC).

4. The IC of claim 1, wherein the compute platform includes a mezzanine card slot configured in accordance with an Open Computer Platform (OCP) specification, and the PHY card comprises a mezzanine PHY card configured to be installed the mezzanine card slot.

5. The IC of claim 1, wherein the interface comprises a MAC-to-PHY interface configured to interface with a PHY interface on the PHY card.

6. The IC of claim 1, wherein the interface comprises a MAC interface configured to interface with a MAC-to-PHY interface on the PHY card.

7. The IC of claim 1, wherein the IC further includes non-volatile memory, and wherein the firmware instructions, when executed, are configured to cause the IC to:
    read PHY card configuration data stored on the PHY card including a PHY card identifier (ID); and
    compare the PHY card ID to a list of valid PHY card IDs stored in the non-volatile memory to determine whether the PHY card is supported by the IC.

8. The IC of claim 1, wherein the firmware instructions, when executed, are configured to cause the IC to:
    read configuration parameters from the PHY card, including a number of ports provided by the PHY card, and at least one of a device and subdevice ID for each port; and
    program Peripheral Component Interconnect Express (PCIe) configuration parameters corresponding to the configuration parameters that are read into a PCIe configuration space associated with the MAC block.

9. The IC of claim 8, wherein the firmware instructions, when executed, are configured to cause the IC to:
    store, on the IC, a current PHY card identifier (ID) corresponding to a PHY card currently installed in the computer platform;
    during a subsequent initialization of the computer platform, read a PHY card identifier (ID) stored on a PHY card installed in the compute platform during the subsequent initialization of the computer platform; and
compare the PHY card ID that is read to the current PHY card ID that is stored, and if there is a match, use the PCI configuration parameters programmed into the PCIe configuration space.

10. The IC of claim 8, wherein the IC further comprises a PCIe Root Complex and a PCIe interconnect segment to which the MAC block is coupled, and wherein the IC is configured, when operating, to read the PCIe configuration parameters and enumerate one or more PCIe devices corresponding to Physical functions supported by the PHY card.

11. The IC of claim 1, wherein a PHY configuration script for each of at least one PHY card is stored on the IC, and wherein the firmware instructions, when executed, are configured to cause the IC to:
read a PHY card identifier (ID) stored on the PHY card;
select a PHY configuration script stored on the IC based on the PHY card ID; and
execute the PHY configuration script to configure the PHY card.

12. A method, comprising:
reading PHY card configuration data stored on a PHY card including a PHY card identifier (ID), the PHY card installed in a computer platform including at least one port and configured to support Physical layer functionality associated with at least one communication protocol stacks and to communicate with a Media Access Control (MAC) block configured to support MAC layer functionality for the at least one communication protocol stack, the MAC block implemented in an integrated circuit (IC) component in the computer platform that is separate from the PHY card;
comparing the PHY card ID to a list of valid PHY card IDs to determine whether the PHY card is a valid PHY card; and
if the PHY card is determined to be a valid PHY card, configuring the PHY card to implement Physical layer functionality associated with the at least one communication protocol stack for at least one port.

13. The method of claim 12, further comprising:
reading configuration parameters from the PHY card, including a number of ports provided by the PHY card, and at least one of a device and subdevice ID for each port; and
programming Peripheral Component Interconnect Express (PCIe) configuration parameters corresponding to the configuration parameters that are read into a PCIe configuration space associated with the MAC block.

14. The method of claim 12, further comprising reading the PCIe configuration parameters and enumerating one or more PCIe devices corresponding to Physical functions supported by the PHY card.

15. The method of claim 12, further comprising:
storing a current PHY card identifier (ID) corresponding to a PHY card installed in the computer platform on the IC component;
during a subsequent initialization of the compute platform,
reading a PHY card identifier (ID) stored on the PHY card;
comparing the PHY card ID that is read to the current PHY card ID that is stored, and if there is a match, use the PCIe configuration parameters programmed into the PCIe configuration space.

16. The method of claim 12, further comprising:
storing a PHY configuration script for at least one PHY card;
selecting a PHY configuration script based on the PHY card ID that is read; and
executing the PHY configuration script to configure the PHY card.

17. The method of claim 12, further comprising:
determining the PHY card ID corresponds to a PHY card that is not supported by the MAC layer block;
writing out an error code; and
propagating the error code to a Peripheral Component Interconnect Express (PCIe) configuration space associated with the MAC block.

18. The method of claim 12, further comprising implementing communication between the IC component and the PHY card using at least one sideband channel.

19. The method of claim 12, wherein the PHY card is installed in a mezzanine card slot configured in accordance with an Open Computer Platform (OCP) mezzanine card specification.

20. A computer platform comprising:
a main board;
a mezzanine card slot including a connector communicatively coupled to the main board;
a PHY card, coupled to the connector and installed in the mezzanine card slot, the PHY card including at least one port and configured to support Physical (PHY) layer functionality associated with at least one communication protocol stack including a media access control (MAC) layer; and
an integrated circuit (IC) chip, mounted on the main board and including,
a MAC block, configured to implement MAC layer functionality associated with one or more communication protocol stacks including a PHY layer;
an interface, configured to couple signals between the MAC block and the PHY card via the connector; and
firmware instructions, configured to be executed by one of a processing element on the IC or on a processor to which the IC is configured to be coupled to when installed in the computer platform, the firmware instructions configured, upon execution, to configure the MAC block and PHY card for use in the computer platform.

21. The computer platform of claim 20, wherein the IC chip comprises a Platform Controller Hub (PCH), and the computer platform further includes a processor to which the PCH is coupled.

22. The computer platform of claim 20, wherein the IC chip comprises a processor System on a Chip (SoC).

23. The computer platform of claim 20, wherein the firmware instructions, upon execution, are further configured to:
read configuration parameters from the PHY card, including a number of ports provided by the PHY card, and at least one of a device and subdevice ID for each port; and
program Peripheral Component Interconnect Express (PCIe) configuration parameters corresponding to the configuration parameters that are read into a PCIe configuration space associated with the MAC block,
and wherein the computer platform is configured to read the PCIe configuration parameters and enumerate one or more PCIe devices corresponding to Physical functions supported by the PHY card.

24. The computer platform of claim 23, wherein the firmware instructions, upon execution, are further configured to:
- store a current PHY card identifier (ID) corresponding to a PHY card installed in the computer platform on the IC component;
- during a subsequent initialization of the compute platform,
- read a PHY card identifier (ID) stored on the PHY card; and
- compare the PHY card ID that is read to the current PHY card ID that is stored, and if there is a match, use the PCIe configuration parameters programmed into the PCIe configuration space to enumerate the one or more PCIe devices corresponding to Physical functions supported by the PHY card.

25. The computer platform of claim 20, wherein the firmware instructions, upon execution, are further configured to:
- read PHY card configuration data stored on the PHY card including a PHY card identifier (ID);
- compare the PHY card ID to a list of valid PHY card IDs stored on the IC chip to determine whether the PHY card is a valid PHY card; and
- if the PHY card is determined to be a valid PHY card, configure the PHY card to implement Physical layer functionality associated with the at least one communication protocol stack for at least one port.

* * * * *